United States Patent [19]
Radigan et al.

[11] Patent Number: 5,555,428
[45] Date of Patent: Sep. 10, 1996

[54] ACTIVITY MASKING WITH MASK CONTEXT OF SIMD PROCESSORS

[75] Inventors: James J. Radigan, Sunnyvale; David A. Schwartz, Moorpark, both of Calif.

[73] Assignee: Hughes Aircraft Company, Los Angeles, Calif.

[21] Appl. No.: 402,406

[22] Filed: Mar. 10, 1995

Related U.S. Application Data

[63] Continuation of Ser. No. 989,302, Dec. 11, 1992, abandoned.

[51] Int. Cl.$^6$ ............................................ G06F 15/80
[52] U.S. Cl. .................. 395/800; 364/231.9; 364/DIG. 1
[58] Field of Search .................. 395/800; 364/231.9, 364/DIG. 1

[56] References Cited

U.S. PATENT DOCUMENTS

| | | | |
|---|---|---|---|
| 4,435,758 | 3/1984 | Lorie et al. | 395/800 |
| 4,907,148 | 3/1990 | Morton | 395/800 |
| 5,045,995 | 9/1991 | Levinthal et al. | 395/375 |
| 5,307,506 | 4/1994 | Colwell et al. | 395/800 |

FOREIGN PATENT DOCUMENTS 2201015  8/1988  United Kingdom.

OTHER PUBLICATIONS

Nation et al., "Efficient Masking Techniques for Large-Scale SIMD Architectures", Third Symposium on the Frontiers of Massively Parallel Computations, IEEE Computer Society Press, Oct. 1990, pp. 259–264.

Horde, R. Michael, "Parallel Supercomputing in SIMD Architectures," 1990, CRC Press Inc., Boca Raton, FL., pp. 85–105 and 143–148.

Steven et al., "HARP: A Parallel Pipeline RISC Processor," Microprocessors and Microsystems, vol. 13, No. 9, Nov. 1989, pp. 579–587.

Przytula, K. Wojtek, "Medium Grain Parallel Architecture For Image and Signal Processing," Parallel Architectures and Algorithms For Image Understanding, 1991.

*Primary Examiner*—Meng-Ai T. An
*Assistant Examiner*—John Harrity
*Attorney, Agent, or Firm*—V. D. Duraiswamy; W. K. Denson-Low

[57] ABSTRACT

Disclosed is a masking technique for a SIMD processor (10) which is capable of masking a plurality of individual machine operations within a single instruction incorporating a plurality of operations. To accomplish this each different machine operation within the instruction includes a number of masking bits which address a specific location in a mask register (60). The mask register (60) includes a mask bit bank (62). The mask location selected within the mask register (60) is bit-wise ANDed with a mask context bit (66) in order to establish whether the processing element will be enabled or disabled for a particular conditional sub-routine which is called. One of the bit locations in the mask bit bank (60) is a hard-wired unconditional bit which overrides the mask context bit (66) in order to enable the processing elements in special situations. In addition, a scalar mask bit is provided to facilitate scalar processing. By this operation, instructional parallelism can be incorporated in order to increase through-put of the processor.

21 Claims, 4 Drawing Sheets

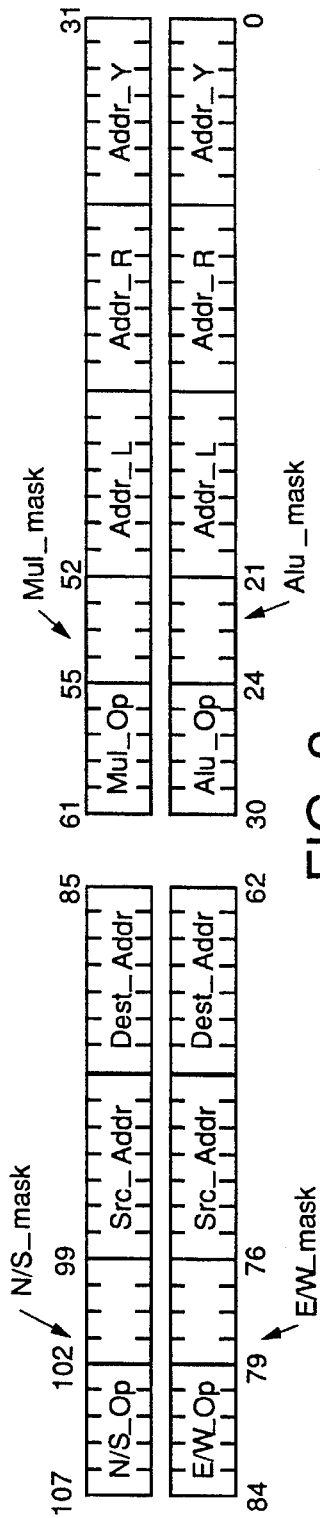
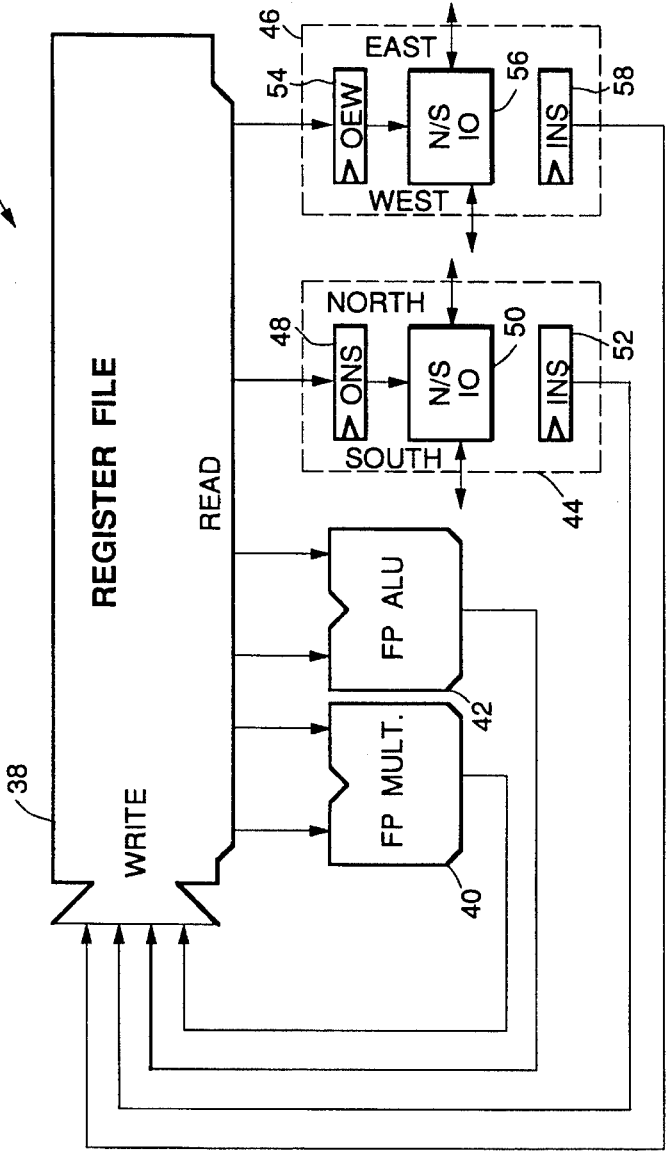
FIG. 2.
FIG. 4a.

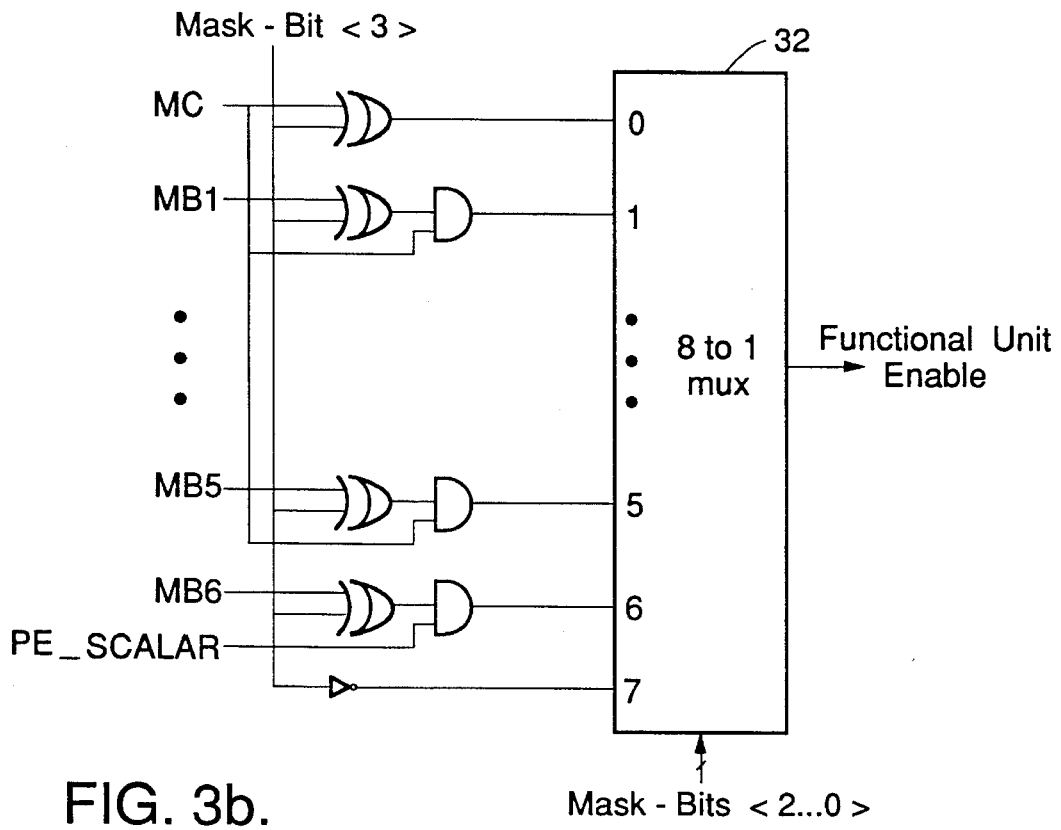
FIG. 3b.
FIG. 4b.
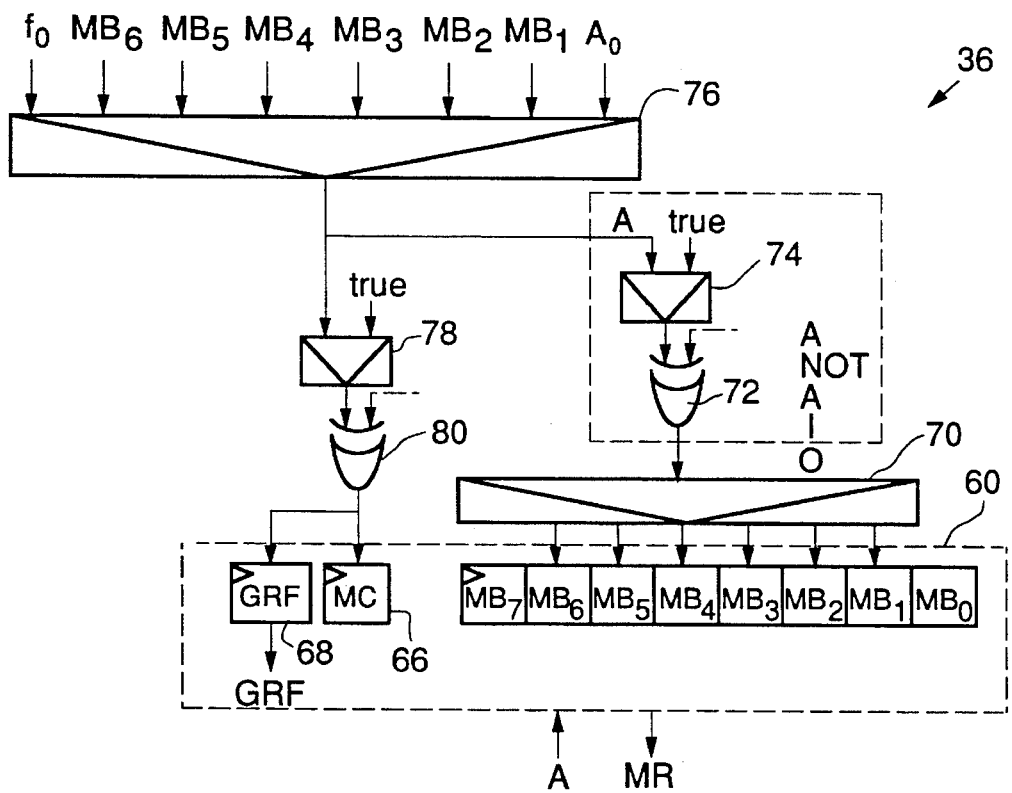

ACTIVITY MASKING WITH MASK CONTEXT OF SIMD PROCESSORS

This is a continuation application of Ser. No. 07/989,302, filed Dec. 11, 1992, now abandoned.

BACKGROUND OF THE INVENTION

1. Field Of The Invention

This invention relates generally to a masking technique for array computers, and more particularly, to a fine grain masking technique for an SIMD computer which includes multiple instruction level masking.

2. Description of the Related Art

Typically, computers are uni-processors which operate on a single instruction and a single data stream (SISD). That is, the uni-processor computer includes a single processing element that will operate on a single instruction in a program with only one set of data available every clock cycle. It is further known in the art to include multiple processing elements in a computer in which all of the processing elements operate on a single instruction and multiple data streams (SIMD). In these types of SIMD computers or processors, different data is usually applied to each individual processing element, but each processing element receives the same instruction sequence during the same clock cycle. Among the advantages of the SIMD computer over the uni-processor is the reduction in costs of the control unit and the reduction in program memory required.

In the SIMD computer, as well as other types of computers, a fundamental concept, generally referred to as masking, is required for conditional execution of individual operations in the processing elements. Masking enables the different instructions of an instruction sequence which is applied to the processing elements to only be implemented in those processing elements in which the particular data being applied to the separate processing elements meets the conditions of the particular instructions within the sequence. Different techniques are known in the art which mask a particular processing element from certain instructions in an instruction sequence applied to the processing elements. A detailed summary of contemporary SIMD machines using masking can be found in Horde, R. Michael, "Parallel Supercomputing in SIMD Architectures" 1990 CRC Press Inc , Boca Raton, Fla. Additionally, U.S. Pat. Nos. 4,907,148 and 5,045,995 also provide discussions of masking in these types of systems.

As mentioned above, the prior art masking in a SIMD computer can mask the instruction for any number of the processing elements of the computer such that the instruction will not operate on the data. However, many instruction formats may include multiple conditional executions or operations. These instructions are generally referred to as very long instruction words (VLIW). Sophisticated SIMD computers can therefore, not only benefit from parallelism due to multiple processing elements, but also from parallelism due to multiple operations per instruction.

It is known in the art to provide for selective masking of multiple operations in a single instruction for a single processor. For at least one discussion of multiple masking techniques, see Steven et al., "HARP: A Parallel Pipeline RISC Processor," Microprocessors and Microsystems, Vol. 13, No. 9, November 1989, pp. 579–587. Steven et al. introduced the concept of conditionalizing all instructions by adding a field to an instruction that specifies a boolean register to test for controlling a conditional execution of an instruction, and a field which controls the sense of the condition, i.e., execute if the boolean register is true or execute if the boolean register is false. A special register is incorporated which is always true resulting in an unconditional operation. This process has been limited, however, to a single processor. Multiple masking in an SIMD architecture does not appear to be shown in the prior art.

Prior art multiple masking techniques are not capable of providing the necessary masking of multiple processing elements to support conditional subroutine calls. Therefore, the prior art masking techniques limit the processing through-put which is practical with current compiler technology and identical hardware costs. What is needed is a masking technique which is capable of masking multiple conditional executions of individual operations within a single instruction in an SIMD computer. It is therefore an object of the present invention to provide such a masking technique in an SIMD computer.

SUMMARY OF THE INVENTION

Disclosed is a masking technique for a SIMD processor to provide multiple masking of a plurality of operations performable under certain conditions within the instructions. To accomplish this, the instruction contains a series of masking bits for each operation which addresses a specific location in a registry which may be referred to as the masking bit bank.

A single instruction in a realization based on a very long instruction word architecture may contain multiple functions/operations, such as one or more of an arithmetic functional unit, a multiplier, a North/South I/O function, and an East/West I/O function. Each of these different functions in the instruction will typically include an address location for registering a desirable mask bit. Consequently, each of the different machine operations in a single machine instruction may select a different individual mask bit from the appropriate set of mask registers, thus allowing the concurrent execution of several different cases of conditional control.

The same approach to multiple masks also applies to the case of instructions which specify only a single operation. This allows operations that would have required conditional branches that lower processor performance to be performed without the need of branches. Multiple masks will also apply to "super-scalar" processors that combine multiple instructions to be executed in parallel, resulting in a similar effect as the very long instruction word architecture case.

In order to support conditional subroutine calls in the presence of multiple masks, a globally enabling mask context bit is incorporated. In a SIMD processor, when a subroutine call is in a conditional block of code, the desired behavior is that the subroutine be performed only on the group of processing elements where the condition of the surrounding block of code is true. In a SIMD machine all processing elements perform the subroutine call. Therefore, it is necessary to selectively disable the effects of the subroutine call on those processing elements that were effectively masked off when the call was made. This condition only arises when there are multiple masks. A single mask context bit is incorporated into each processing element. The mask context bit is bit-wise ANDed with all the bits which are selected for masking in a machine specific operation. Therefore, the particular processing element can be enabled or disabled based on the "context" of the procedure call.

Additional objects, advantages, and features of the present invention will become apparent from the following descrip-

3

BRIEF DESCRIPTION OF THE DRAWINGS

FIG. 2 shows the format of a SIMD microcode instruction;

FIG. 3(b) shows the masking portion of the processing element of FIG. 3(a); and

FIGS. 4(a) and 4(b) show certain computer architecture components of a processing element of an SIMD computer according to a preferred embodiment of the present invention.

DETAILED DESCRIPTION OF THE PREFERRED EMBODIMENT

Figure 1A:
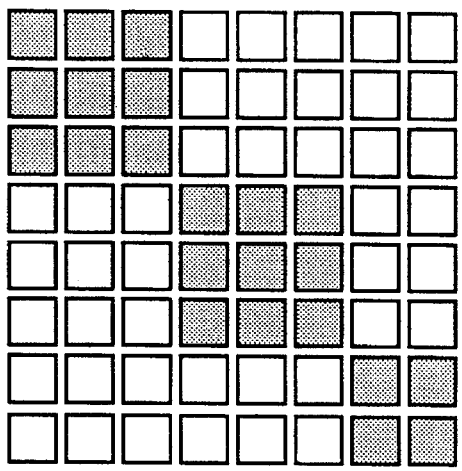
FIGS. 1(a)–1(e) is an array of processing elements shown in block form typifying active and unactive processing elements.
Figure 1B:
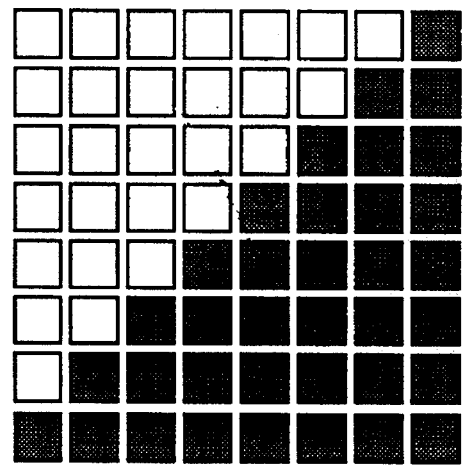
Figure 1C:
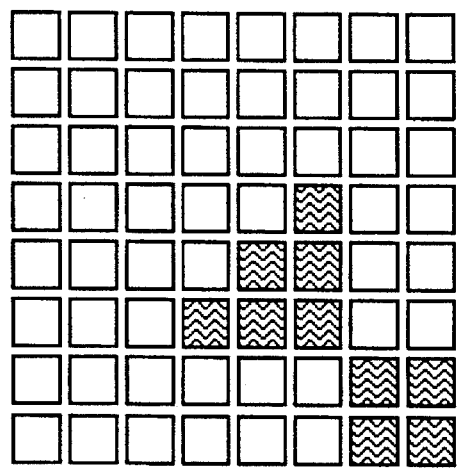

The following description of the preferred embodiments concerning masking of SIMD computers is merely exemplary in nature and is in no way intended to limit the invention or its application or uses.

As discussed above, masking of operations in SIMD parallel processors is a basic requirement. This masking is the manner in which an SIMD processor handles conditional execution of codes where the condition arises from an array/vector comparison. For example, consider a simple SIMD system with P number of processing elements (PEs). Further, let the SIMD variables be an array/vector of variables such that there is one variable per processing element. Given an SIMD variable X in which we want to perform an operation only on those processing elements in which X is negative, we might write, using "C" language notation and where /* */ represents descriptive comments:

```
1)  SIMD float X;
2)  if (X < 0.0) {
3)       /* then clause basic block of code */
4)       ...
5)  }
```

The conditional SIMD expression (X<0.0) evaluates to a special SIMD boolean variable that is true on those processing elements where the expression is true and similarly false on those processing elements where the expression is false. We refer to the set of processors where the expression is true as the active set of processing elements. In a hardware configuration we may implement certain conditionals by using a boolean mask flag, well known to those skilled in the art, in each processing element to disable the processing element if the mask flag is false. Thus, we execute the "then clause" of the above operation on all processing elements, but only enable those processing elements where the mask flag is set for true.

Now consider the following, more complex nested conditional instruction sequence:

```
1)  SIMD float X, Y, Z;
2)  if (X < 0.0) {
3)       /* Where (X < 0.0) */
4)       X = X*Y;
5)       if (Y == 1.0) {
6)            /* Where ((X < 0.0) && (Y == 1.0)) */
7)            Y = -Y;
8)       } else {
9)            /* Where ((X < 0.0) && (Y != 1.0)) */
10)           Y = 2.0*Y;
11)      }
12) } else {
13)      /* Where (X >= 0.0) */
14)      X = Z;
15) }
```

In this example, line 2 represents a certain SIMD conditional and lines 3–11 represent the body of that conditional. The SIMD conditional in line 2 sets the active set to those processing elements where (X<0.0). Thus, the SIMD conditional in line 5 within the body of the conditional of line 2 is only evaluated on those processing elements which are in the active set. Therefore the clause body of lines 6 and 7 of the conditional in line 5 has an active set that is the intersection (logical AND) of the sets generated by the conditional expressions (X<0.0) and (Y==1.0) above.

FIG. 1 gives a physical representation of the active sets of the sequence of instruction code above. Specifically, FIGS. 1(a)–1(e) show an array of processing elements in a square configuration (64 processing elements) in which the shaded boxes show which processing elements satisfy the certain conditionals. Typically, the processing elements in each row will be connected by an I/O channel such that the processing elements can exchange data in an East/West direction, and the processing elements in each column will be connected by an I/O channel such that the processing elements can exchange data in a North/South direction. FIG. 1(a) illustrates the active set associated with the conditional of line 2 of the instruction code sequence above. In other words, the shaded boxes indicate those processing elements which satisfy the requirements of (X<0.0). Similarly, FIG. 1(b) illustrates the active set of the processing elements which satisfy the conditional of line 5 of the instruction code sequence if it were separate, namely (Y=1.0). FIG. 1(c) illustrates the active set associated with line 5 of the above sequence of code and as such, is the overlap of FIGS. 1(a) and 1(b). In other words, the shaded boxes of FIG. 1(c) is the logical AND of (X<0.0) and (Y=1.0).

Figure 1D:
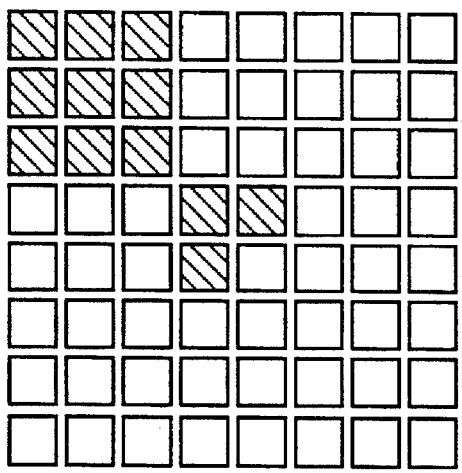
Figure 1E:
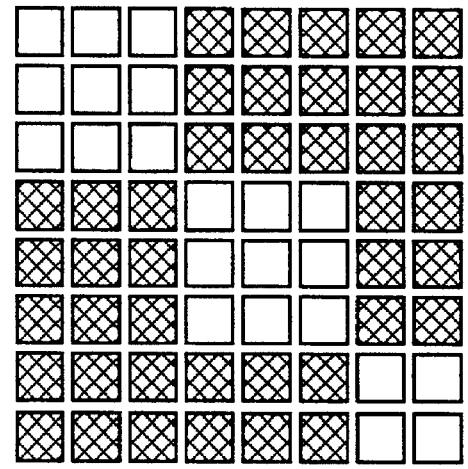

As is known, SIMD programming departs from traditional uni-processor programming in that a SIMD conditional with a "then" and an "else" must execute both clauses, where in an uni-processor only one of the condition clauses will be executed. This is due to the fact that both clauses may have non-empty active sets. FIG. 1(d) represents the active shading region as shown to be the processing elements of the logical AND of (X<0.0) and (Y!=1.0). In addition, FIG. 1(e) represents those shaded active processing elements in which (X≧0.0).

This basic approach to SIMD masking is sufficient for simple processing elements. However, if there is functional parallelism, i.e., multiple operations in a single instruction within a processing element, this approach is inadequate. Consider the case of a processing element implementing a VLIW with four function units: 1) a multiplier; 2) an arithmetic logic unit (ALU); 3) a North/South input/output (I/O) unit; and 4) an East/West I/O unit. In some algorithms, such as a fast fourier transformation (FFT) processing device, we may require that some of the processing elements, based on their position, participate in a data exchange (I/O) with other processing elements in order to effect a permutation of a partial plane of data. Simultaneously, under one single instruction control, all the processing elements should be performing some arithmetic computation while also downloading the data (I/O) for another independent data computation. The masking of I/O separate from computation is vital in this FFT example because it allows us to maximally overlap computations with I/O in each processing element, and thus, not only exploit parallelism due to the replication of processing elements, but also parallelism due to the ability to selectively mask certain portions of an instruction given to a processing element. In this type of condition, the two I/O directions (East/West and North/South) are independent tasks, and thus, require very different masks. Consequently, many algorithms have separate tasks that can be overlapped when there is a mechanism to support the multiple masking.

According to a preferred embodiment of the present invention, fine grain masking is made applicable to VLIW type processing elements in an SIMD processor in order to separately mask a multiplication, an ALU operation, a North/South I/O operation and an East/West I/O operation in a single instruction. The preferred embodiment of this invention does not draw a distinction between the masking of I/O operations and other function unit operations. Each machine operation in a single micro-code instruction will be masked by one of eight programmer visible, single bit registers ($MB_0$–$MB_7$) of a mask bit register as will be discussed below. By this, it is apparent that each micro-operation is a conditional operation. As will be described, each of the machine operations in a single machine instruction may select a different individual mask bit. This concept of architectural support for masking will allow for an optimal overlap of operations across loop iterations and will remain a viable compiler target.

FIG. 2 illustrates a bit representation of a micro-code instruction format for an individual processing element. As is apparent there is a separate mask field associated with each of four (4) independent functions of the micro-code instruction. Specifically, bits 0–30 include the bit representation for an ALU operation in which the operands are in the registers at address locations L and R, and the result is put in the register at address location Y. The operation further includes a 4-bit mask location (bits 21–24). Similarly, a multiply operation instruction is represented by bits 31–61. The multiply operation also has a 4-bit mask location (bits 52–55) where three of the bits specify the address of the mask bit and the remaining bit is the complement bit. In addition, there is a North/South operation which includes a 4-bit mask location (bits 76–79). Further, there is an East/West I/O operation which includes a 4-bit mask location (bits 99–102).

The mask fields can be broken down into two fields, an invert mask sense field and a bit bank address field. The invert mask field is a single bit and the bit bank address field is the 3 least significant bits of the mask bit field. In other words, the last 3 bits of each mask field are a bit bank location and as such can be any of one of eight locations. The invert mask bit is a complement bit.

Figure 3A:
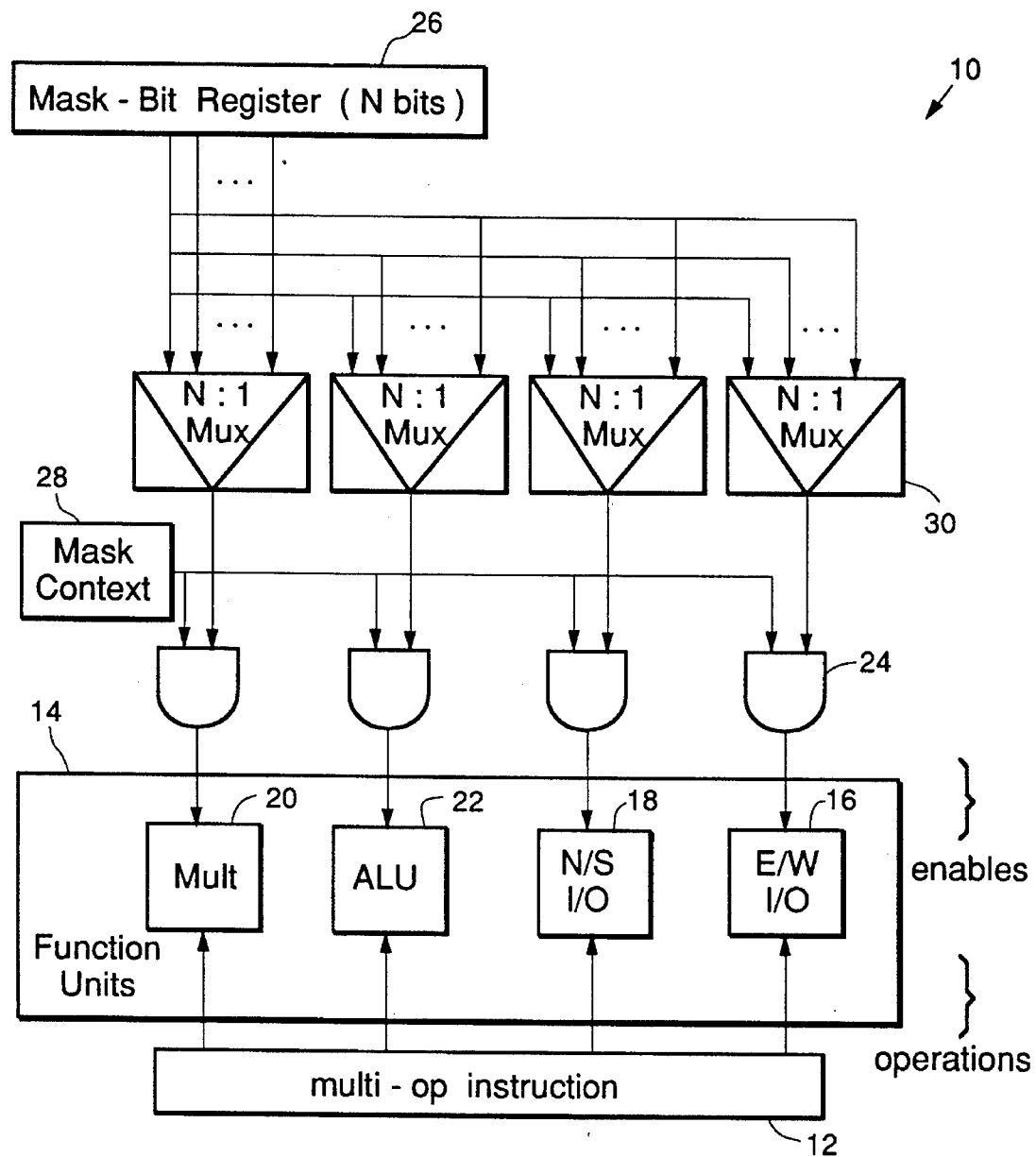
FIG. 3(a) is a block diagram showing the basic components of one processing element of an array of processing elements according to a preferred embodiment of the present invention.

Turning to FIG. 3a, shown in block diagram form are certain components of a single processing element 10 including components according to a preferred embodiment of the present invention. More particularly, a register 12 storing a multi-operational instruction is shown being applied to a processing unit 14 incorporating a plurality of function units. The function units include an East/West I/O unit 16, a North/South I/O unit 18, a multiplication unit 20 and an arithmetic logic unit 22, as discussed above. The operation to be performed by each function unit is determined by the multi-operational instruction. The operation of each function unit is then enabled, or disabled by providing each function unit with an additional control signal from a series of AND gates 24. The output from the AND gates 24 is the logical AND of the value of a selection mask register 26 and a mask context register 28. The desirable bit of the mask register 26 is selected by an appropriate multiplexer 30 for the particular function unit to perform the desirable masking of the operation.

FIG. 3(b) shows a more detailed illustration of the masking portion of the preferred embodiment. Each of the four functional units requires its own enable signal to mask its operation. The enable signals are determined from an 8 to 1 Multiplexer 32, which uses the lower order 3 bits (Mask-Bits < 2...0 >) for control, and produces the enable signal as its output. The first input to the multiplexer 32 is the XOR of the Mask-Context (MC) bit from the mask context bit register 28 and an invert control bit (Mask-Bits <3 >). Inputs 1 through 5 are the selected mask bit ($MB_j$, where $1 \leq j \leq 5$) XORed with the invert control bit, and then ANDed with the MC bit. The sixth input to the multiplexer 32 is the XOR of the invert control bit with MB6, and then ANDed with a PE_SCALAR signal. The signal PE_SCALAR is only one at a single PE in the array, thereby facilitating scalar processing. In the preferred embodiment the PE_SCALAR is only one at the North-West most PE. The seventh input to the multiplexer 32 is the complement of Mask-Bits <3 >.

FIG. 4(a) shows the basic components of the computational portion of a PE 36 of an array of PEs of an SIMD processor. The architecture and operation of the computational portion of an SIMD processor is known, and therefore, the description here will only be cursory. Further details may be found in a variety of publications such as Przytula, K. Wojtek, "Medium Grain Parallel Architecture For Image and Signal Processing," Parallel Architectures And Algorithms For Image Understanding, 1991. The PE 36 includes a register file 38 having four write inputs and six read outputs. The components which deliver and accept instructions to and from the register file 38 include a floating point multiplier 40 (FPMULT), a floating point arithmetic logic unit 42 (FP ALU), a North/South Input/Output unit 44, and an East/West Input/Output unit 46. Both the multiplier 40 and the ALU 42 require a maximum of two reads and one write from the register file 38. The I/O units 44 and 46 require a maximum of one read and one write from the register file 38.

The North/South Input/Output unit 44 includes a North/South output register 48 which accepts an instruction from the register file 38 and applies the instruction to a North/South Input/Output circuit 50 which transfers data in a North and South direction, as shown. An output from the North/South Input/Output circuit 50 is applied to a North/South input register 52 which writes data into the register file 38. Likewise, the East/West Input/Output unit 46 includes an East/West output register 54 which accepts read instructions from the register file 38 and transfers the instruction to an East/West Input/Output circuit 56 for transferring data in an East and West direction. An East-West input register 58 accepts an instruction from the East-West Input/Output circuit 56 to be written into the register file 38.

Now turning to FIG. 4(b), the processing element 36 further includes a mask register 60 shown as a dotted box having an output MR. The mask register 60 includes a function unit bit bank 62 having 8 bits labeled $MB_0$–$MB_7$. These bits represent the masking bits for the computations as discussed above. The function unit bit $MB_0$ is a hard-wired true bit and the function unit bit $FB_7$ is a hard-wired unconditional bit, as will be discussed hereunder. In a preferred embodiment, scalar operations will be performed at the North-West most PE. A special purpose mask bit MB6 is provided for the North-West most PE in order to facilitate the scalar processing. In the North-West most PE scalar operations will be masked using $MB_6$. In other words, utilizing four masking bits per operation as discussed above for FIG. 2, where three of the bits define the register location and the fourth bit is a complement bit, only enables eight register locations to be addressed.

The mask register 60 further includes a mask context register 66 holding a single mask context (MC) bit and a global response flag register 68 holding a single global response flag (GRF) bit. The mask context bit is bit-wise ANDed with the bit selected for masking of a particular machine operation in the instruction in order to either enable or disable the particular processing element during a sub-routine call, as will be described in further detail below. The global response flag bit is logically ORed with the global response flags of all the other processing elements in the PE 36 in order to determine if any of the processing elements fit the criterion of the conditional sub-routine, as will also be discussed in more detail below.

The function unit bit bank 62 is loaded through a demultiplexer 70. The demultiplexer 70 has an output coupled to each bit in the bit bank 62, except the hard-wired true bit $MB_0$ and $MB_7$. The demultiplexer 70 obtains its input from a XOR gate 72. The XOR gate 72 has two inputs, one from the output of a multiplexer 74 and the other being a complement control. When the complement control is one, the output of the XOR gate 72 is the complement of the output from a multiplier 76, otherwise a true value of the multiplexer 74 output is passed through. Five of the inputs to the multiplexer 76 are from bits from the function bit bank 62, specifically $MB_1$–$MB_6$. Inputs 7 and 8 come from the zero bit of an $A_o$ and an $F_o$ registers. The output of the multiplexer 76 is also applied as one input to a multiplexer 78. The other input of the multiplexer 78 is a standard true. The output of the multiplexer 78 is applied as an input to an XOR gate 80. The output of the XOR gate 80 is applied as inputs to the global response flag register 68 and the mask context bit register 66.

All the bits shown within the mask register 60 form the current masking context of a specific process of an SIMD processor according to a preferred embodiment of the present invention. This context is saved and restored across procedure calls in the operation of the PE 36. In the PE 36 this stack is implemented by saving to (or restoring from) the general purpose register file 68. In other words, the current values in the bit banks of the mask register 60 are outputted to a stack during a sub-routine call and then restored to the bit banks at the end of the sub-routine. Management of the masking context is part of the procedure call and return mechanism.

For a specific illustration of the masking technique, consider the following source code example in which a function call (X>0.0) is dominated by a conditional "if-then" expression:

```
1) SIMD float X, Y;
2) if (X > 0.0) {
3)     Y = foo(X);
4) }
```

The mask context bit in the mask context register 66 implements the current procedure mask context. In the example above, if any processing element indicates that its value of X is greater than 0.0, then the control for all of the processing elements will transfer to foo() by means of the global response flag bit in the register 68, as mentioned above. However, we only want certain processing elements where the condition (X>0.0) is true to participate in the action of foo()'s code. The mask context bit in the mask register 66 supports this notion by acting as a single bit which globally enables or disables an entire processing element. The mask context register 62 is globally enabling because its value is implicitly bit-wise ANDed with all of the bits which are selected for masking in all of the machine operations. By setting the mask context bit to a logically false value in a processing element, regardless of any masking value selected ($MB_0$–$MB_5$) for any machine operation, the outcome will always be false. Thus, any processing element where the mask context bit is logically false, while receiving the same instruction as all of the others, is incapable of participating in any actual execution. The same is true for the SCM bit.

The bit $MB_0$ is hard-wired to true, as discussed above. Thus, any unconditional operation in the assembly language explicitly (or implicitly) specifies $MB_0$. This reduces the overhead of reloading the bit bank to a true value for unconditional code. Bit $MB_7$ is a special exception in that it, like $MB_0$ is always true. However, since bit $MB_7$ is a hard-wired unconditional bit, it will override the mask context bit in the mask context register 66. In other words, it is globally unconditional. This is needed to handle moves that alter the masking context, such that occur in special cases such as in interrupt handlers or for scalar processing on the SIMD array.

When the processing elements are initialized, the mask context register 66 is set to true and the modifiable bits of the bit bank 62 are cleared to a logical false. In addition, the GRF bit is set to a logical false. When a subroutine is called, the mask register bit is pushed on to the mask stack. In the same clock cycle, the mask context bit is loaded with a copy of the conditional mask bit (or its complement) that controls the context of the call in the sub-routine. In addition, the modifiable bits of the bit bank 62 and the GRF bit are cleared to a logical false. The stack captures the previous state from the caller and the mask context bit establishes mask context for the callee. When the procedure returns from the subroutine, the context of the calling procedure is restored from the stack frame.

A specific instruction sequence example of this procedure is given below. The machine code that follows uses "#" and ";" pseudo-ops to enclose all the machine operations that occur in a single machine cycle. The "/* */" pairs enclose noteworthy comments. The "(MBi)" notation indicates a particular bit bank register for masking the operation.

```
simd float X, Y;
if (X > 0.0) {
    Y = foo(X);
}
0)          /* R1:= 0.0, R0 := X, R1:= Y, R2 := param1 */
1)  FLT         MB3, R1, R0
2)  MOVE        R2, R0;
3)  CALL        foo,MB3;
4)  NOP;        /* Or useful instruction in
                   delay 1 slot */
5)  MOVE(MB3)   R1, R2;
6)  ...
7)  foo:
8)  ...         /* Body of foo */
9)  RET;
10) NOP;
11) ...
```

In line 1 we evaluate the conditional expression (X>0.0) and place the result in the bit bank register $MB_3$. The execution of this evaluation is itself masked by a bit bank register $MB_0$, which is always true. The FLT (floating point less than) compare instruction has a latency of two cycles, therefore while waiting for it to complete, we move the value of X to the location on the stack frame for parameter 1, R2, (line 2). In line 3 we make the subroutine call to foo(). The subroutine call involves several actions, including:

```
a) R[SP--] ← MR (where MR ≡ GRF | MC | MB)
b) (sequencer "call" op) ;cycle i
c) MC ← MB3
d) MB1 .. MB6 ← false
```

This procedure saves the mask register, alters the program flow via the sequencer, and sets up a new mask and frame context. Note that the semantics of the masking of the "CALL" instruction is different than the general case. If the call is unconditional, the specified mask register bit establishes the mask context for the callee.

In order to prevent unnecessary overhead of reloading the scalar mask bit bank, a special purpose mask bit $MB_6$ is provided. It is treated just like any other mask bit. However it is "ANDed" with the scalar mask context (SMC) bit, which is zero everywhere except the North-Western most PE facilitating scalar processing. The SCM bit is saved with the MC bit in the mask register.

The return instruction in line 9 restores the mask context:

```
a) MR ← R[--SP]
b) (sequencer "return" op).
```

In addition to considering the masking scheme across the function calls, we must support the concept of nested conditionals, i.e., one conditional within another conditional, within another conditional, etc. Generally, in an SIMD machine the nesting depth of the conditionals tends to be very small, typically one or two conditionals deep. This is because deep nesting results in very inefficient execution in an SIMD machine executing SIMD conditional codes. However, it still may be necessary to handle deeper nesting in certain situations. In addition, trace scheduling can also increase the number of live conditionals. Because of the combination of at least these two factors, along with the need for the true and the unconditional bits ($MB_0$, $MB_7$), the choice of eight masking bits, five of which are general purpose bits, one is for scalar processing, and two of which are hard-wired bits was decided upon. According to a preferred embodiment of the present invention, the minimum number of desirable bits in the bit bank for both the function bit bank and the I/O bit bank is four (4) general purpose bits, one (1) "true" bit, one (1) "unconditional" bit and one (1) "scalar" bit, for a total of seven bits. In a case where the conditional nesting exceeds the number of masking bits, there is a graceful degradation in the performance because we can spill the bit bank into the general purpose registers via the move instruction.

In view of this discussion, consider the following nested source code example:

```
simd float A,B,C,D,X;
...
if ( X < 9.0) {
    A = B + C;
    if (A > X) {
        C = B * D
    }
    else {
        C = A + X;
    }
/ E = A * A;
    F = 9 * A.
```

Now consider the following SCAP assembly code. In this example, each MOVE requires one (1) clock cycle, each compare requires two (2) clock cycles, each floating point operation requires four (4) clock cycles from register to register, and each I/O operation takes one (1) cycle.

```
1) instr  MOVE        R5, 9.0;
2) instr  FLT         MB1, R4, R5;   /* (X < 9.0) */
3) instr  FADD(MB1)   R0, R1, R2     /* A = B + C */
4) instr  GT (MB1)    MB2, R1, R4    /* (A > X) &&
                                        (X <9.0) */
   #      FMULT       R6, R0, R0;    E = A * A
5) instr  FLE(MB1)    MB3, R1, R4    /* (A <= X) &&
                                        (x <9.0) */
          FMULT (MB1) R7, R5, R0;    /* F = 9 * A */
6) instr  FMULT(MB2)  R2, R1, R3     /* C = B*D */
   #      FADD(MB3)   R2, R0, R4     /* C = A+X */
```

The nested conditional, (A>X), should be the logical AND of (x<9.0) and (A>X). One method of achieving this is shown in line 4. In these lines of code, the MB bits are first set to false. Then the compare of (A>X) is conditioned on the compare (X< 9.0). Thus, $MB_2$ is true only where $MB_1$ is true and A>X. After waiting one clock cycle for the result of the inner compare to complete, we can evaluate the "then" and "else". Note that the last two operations are only dependent on the computation of A. Thus, we could pull up its evaluation through the inner conditionals. Finally, note that the masking by "($MB_0$)" is an unconditioned operation. As a convenience in assembly language, lack of a conditional specifier implies a default of $MB_0$ as appropriate.

As mentioned above, SIMD computers use processor masking to handle conditional operations where the condition involves a vector/array expression. While a uni-processor executes only the "then" clause or the "else" clause, an SIMD processor executes both clauses, but disables those processing elements where the condition of the clause is not true. This is because for some elements $X_i<Y_i$, while for other elements $X_j \geq Y_j$. The problem is that in many conditionals, only one clause contains elements where the condition is true. As the nesting depth of the conditional statements increases, the probability of a clause having no true elements increases. This arises because most conditionals handle exceptional circumstances such as boundary conditions. Unfortunately, in SIMD machines all clauses are typically executed unless the programmer explicitly codes a separate test that performs a reduction step and subsequent test to bypass a clause with no true elements. Because of this, we introduce a simple, implicit, hardware mechanism to test if a clause has a non-null active set of processing elements. This is a part of the masking mechanism and it makes it possible to efficiently skip null clauses and significantly improve the processor's performance. We achieve this through the use of a global wired-OR response line from each of the processing elements, called the global response flag (GRF). The global response flag is stored in the global response flag register 68. A mechanism is provided so that the result of a compare or an explicit move operation can be written to the global response flag. For example, consider the following code rewritten from the above code framework:

```
1) instr   ILT(MB0)    GRF, MB1, R1, R2; /* (X < Y) */
2) instr   op(MB1)                       /* Body of "then" clause */
3a) instr  op(MB1);
 b) #      MOVE        GRF, ~MB1;
4) inst    op(MB1);
5) instr   op(MB1);
6a) instr  IF(~GRF)    L1   /* Skip "then" if null
                                active set */
```

-continued

```
  b) instr    op(MB1);
  7) instr    op(MB1);
      ...
 20) instr    op(MB1);
 21a) L1:
      instr   IF(~GRF)    L2    /* Skip "else" if null
                                   active set */
  b) #        op(MB1);
 22) instr    op(MB1);           /* delay slot */
 23) instr    op(MB1);           /* Body of "else" clause */
 24) instr    op(MB1);
      ...
 30) instr    op(MB1);
 31) L2:      ...
```

The "IF" instructions are conditional branches of the sequencer. The "~" denotes the logical complement. The global response flag is bit-wise ANDed with the mask context bit implicitly. This creates the final value that is contributed by each processing element to the wired-OR which the array presents as a possible input read by the global controller. Note that it is necessary to globally OR both the result of the compare for the "then" clause and the complement of the compare for the "else" clause. This is because the global OR(~ GRF) ≠~global OR(GRF). In addition, the GRF bit can also be the target of an ALU operation or a move instruction. It could be explicitly written to in order to set the value read by the controller. This provides a general SIMD feedback mechanism to the controller.

The foregoing discussion discloses and describes merely exemplary embodiments of the present invention. One skilled in the art will readily recognize from such discussion, and from the accompanying drawings and claims that various changes, modifications and variations can be made therein without departing from the spirit and scope of the invention as defined in the following claims.

What is claimed is:

1. A single instruction multiple data (SIMD) architecture including multiple interconnected processing elements, each of said processing elements comprising:

memory means for storing data;

function means for performing computational and/or Input/Output (I/O) operations;

multi-operation instruction register means for storing an instruction for normally causing said function means to simultaneously perform multiple operations;

mask register means for storing a plurality of mask bits, said mask register means including a mask context bit register holding a mask context bit, said mask context bit being logically combined with at least one of the plurality of mask bits for masking one of the operations;

means for setting a condition mask bit, said condition mask bit being one of the plurality of mask bits, wherein the condition mask bit selectively prevents certain operations from being performed; and stack means for storing the contents of the mask register means during a subroutine call so as to save a context of the processing element during the subroutine call, wherein a state of the mask context bit prior to the subroutine call is stored in the stack means, and wherein a state of the condition mask bit is stored in the mask context bit register during the subroutine call, said stack means stacking multiple contents of the mask register means in sequence for multiple nested subroutine calls.

2. The SIMD architecture according to claim 1 wherein the mask context bit is selectively bit-wise logically ANDed with the at least one mask bit.

3. The SIMD architecture according to claim 2 wherein one bit of the mask register means is a hard-wired unconditional bit which overrides the mask context bit.

4. The SIMD architecture according to claim 1 wherein the mask register means includes a plurality of function unit bits.

5. The SIMD architecture according to claim 4 wherein one bit of the mask register means is a hard-wired true bit.

6. The SIMD architecture according to claim 4 wherein the mask register means includes eight bits selectively addressable by a three-bit address location.

7. The SIMD architecture according to claim 1 wherein a North-Western most processing element is selected to perform scalar operations.

8. The SIMD architecture according to claim 7 wherein the mask register means includes a scalar mask context bit, said scalar mask context bit being zero at every processing element except for the North-Western most processing element in order to perform scalar processing in the North-Western most processing element.

9. The SIMD architecture according to claim 1 further comprising return means for returning the contents of the stack means to the mask register means at the end of the subroutine call to put the mask register means back to its state prior to the subroutine call, and returning the mask context bit during the subroutine call to the condition mask bit before the subroutine call.

10. A method of data processing in a single instruction multiple data stream processor which includes a plurality of processing elements, said method comprising the steps of:

administering a set of instructions to each of the processing elements in which at least one instruction includes a plurality of different machine operations;

administering a predetermined set of data to each of the processing elements;

masking each individual machine operation within a single instruction which does not satisfy requirements of a particular conditional statement within the set of instructions, said step of masking including the steps of selecting a specific mask bit from a set of mask bit registers, logically combining the selected mask bit with a mask context bit for masking a particular machine operation, said mask context bit being stored in a mask context bit register and being set according to the particular conditional statement, and enabling or disabling the processing element depending on the outcome of the combining step; and storing the contents of the mask bit registers and the mask context bit in a stack during a subroutine call so as to save a context of the processing element when the processing element performs a subroutine, said step of storing the contents of the mask context bit including storing a state of the mask context bit prior to the subroutine call in the stack and storing the specific mask bit in the mask context bit register, said step of storing the contents of the mask register in the stack including storing multiple contents of the mask register in sequence on the stack for multiple nested subroutine calls.

11. The method according to claim 10 wherein the step of selecting a mask bit from a mask bit register includes the steps of selecting a mask bit from a mask bit register including a hard-wired true bit.

12. The method according to claim 10 wherein the step of selecting a mask bit from a mask bit register includes the steps of selecting a mask bit from a mask bit register including a hard-wired unconditional bit which overrides the mask context bit.

13. The method according to claim 10 further comprising the step of logically ORing a bit in a global response flag register with a bit in a global response flag register from every other processing element to determine if any of the processing elements meet the conditional requirements of the conditional instruction.

14. The method according to claim 10 wherein the step of selecting a mask bit from a mask register includes selecting a mask bit from an eight bit function bit bank.

15. The method according to claim 10 further comprising the step of logically ANDing a special purpose mask context bit with a scalar mask context bit, wherein the scalar mask context bit can only be true at one PE in order to facilitate scalar processing.

16. The method according to claim 10 further comprising the step of returning the contents of the stack that was previously stored in the mask bit registers prior to the subroutine call to the mask bit registers after completion of the subroutine call.

17. A single instruction multiple data architecture including multiple interconnected processing elements, each of said processing elements comprising:

memory means for storing data;

function means for performing computational operations and Input/Output (I/O) operations;

multi-operation instruction register means for storing an instruction for normally causing said function means to simultaneously perform their respective operations;

mask register means for storing a plurality of mask bits, at least one mask bit being associated with the function means, said mask register means further including a mask context bit register for storing a mask context bit, said mask context bit being selectively bit-wise logically ANDed with at least one function mask bit;

means for setting the at least one mask bit as a function of a condition of the data in said memory means, wherein the contents of said mask register means selectively prevents certain operations from being performed;

stack means for storing the contents of the mask register means during a subroutine call so as to save a context of the processing element when the processing element performs a subroutine, wherein a state of the mask context bit prior to the subroutine call is stored in the stack means, and wherein the at least one function mask bit is stored in the mask context bit register during the subroutine call, said stack means stacking multiple contents of the mask register means in sequence for multiple nested subroutine calls; and return means for returning contents of the stack to the mask register means at an end of the subroutine call to put the mask register means back to its state before the subroutine call, said return means returning the state of the mask context bit register to the at least one function mask bit at the end of the subroutine call.

18. The architecture according to claim 17 wherein one bit of a both the mask bits associated with the function means is a hard-wired true bit.

19. The architecture according to claim 17 wherein one bit of the mask register means is a hard-wired unconditional bit which overrides the mask context bit.

20. The architecture according to claim 17 wherein the mask register means includes a global response flag register for storing a global response flag bit, said global response flag bit being logically ORed with another global response flag bit of each processing element to determine if any of the processing elements meets conditional requirements of a particular instruction sequence.

21. The architecture according to claim 17 wherein the mask register means includes a scalar mask contect bit register storing a scalar mask context bit wherein the scalar mask context bit is zero everywhere except a North-Western most processing element in order to facilitate scalar processing.

* * * * *